Patented Mar. 21, 1933

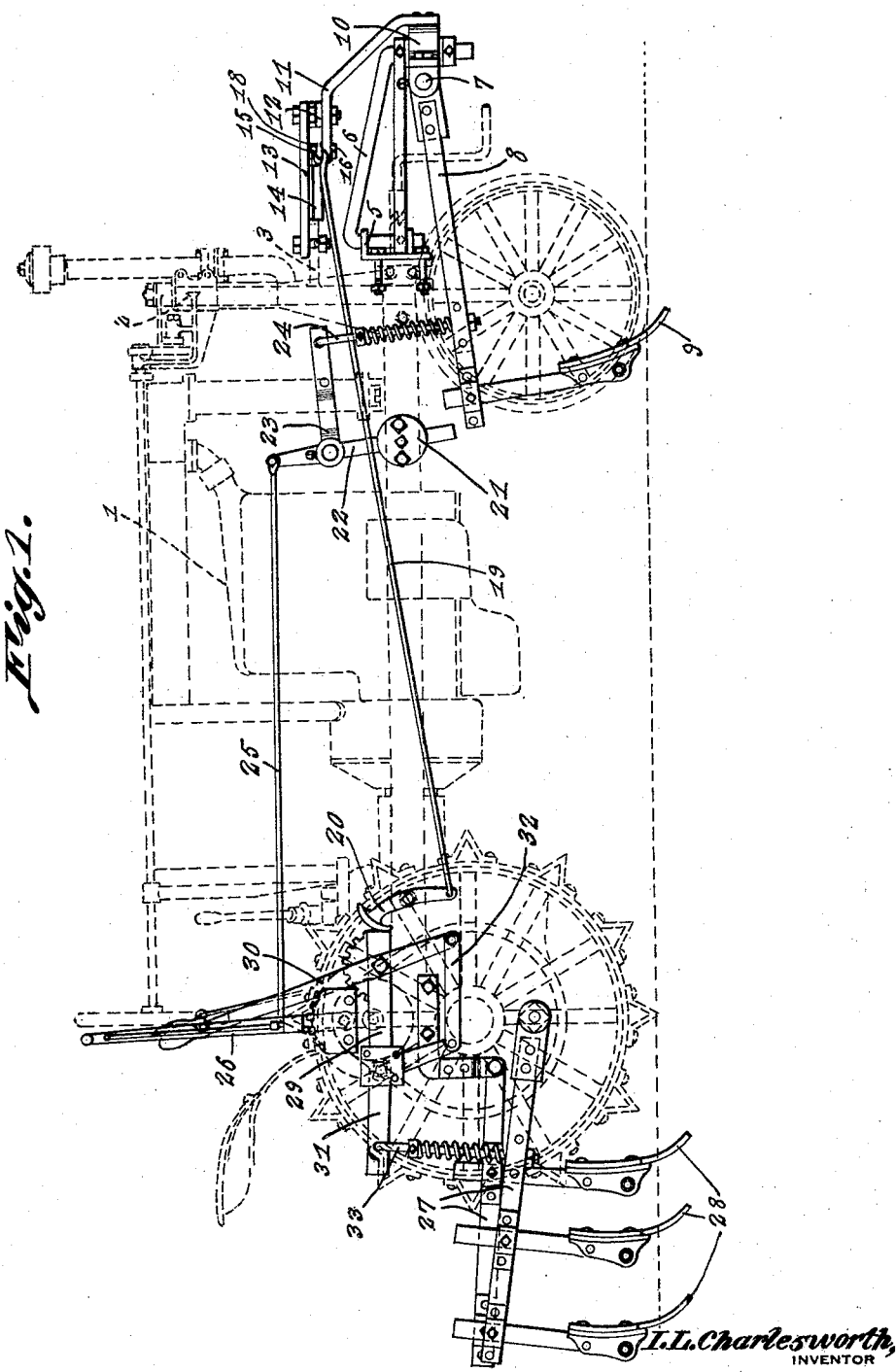

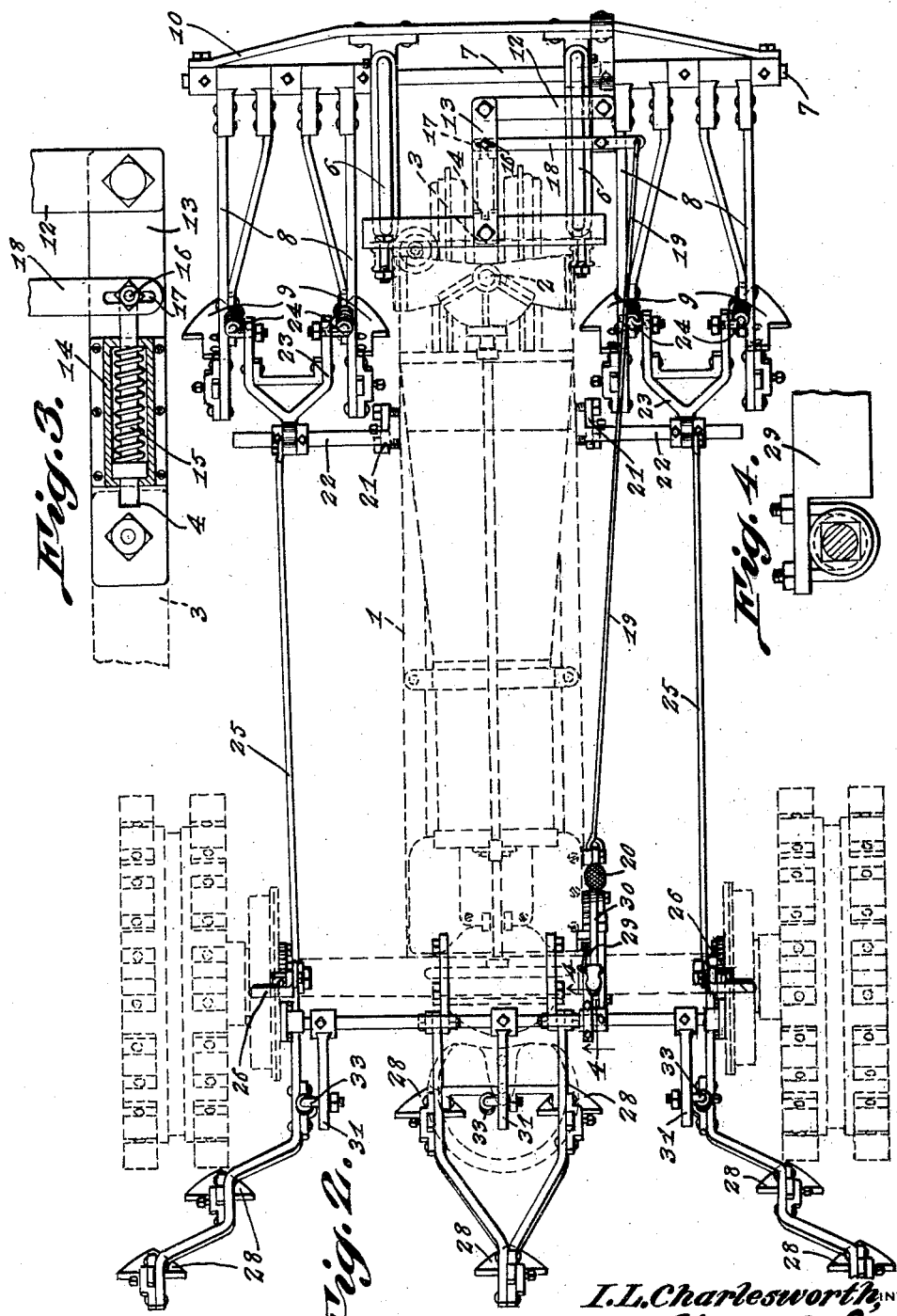

1,902,689

UNITED STATES PATENT OFFICE

IRA L. CHARLESWORTH, OF NEWTON, IOWA

TRACTOR CULTIVATOR

Application filed October 5, 1931. Serial No. 567,054.

This invention relates to a tractor cultivator attachment, and it consists in the novel features hereinafter described and claimed.

An object of this invention is to provide an attachment of the character indicated which is light in weight and adapted to permit very short turns at the headlands when not actually working in the soil, thereby avoiding accidental damage to the standing plants.

A further object of the invention is to provide an attachment of the character stated having steering mechanism and cultivating mechanism correlating in such manner that the steering mechanism is employed to guide the cultivator while it works and the position of the cultivating implements in turn controls the steering means.

In the accompanying drawings:—

Figure 1 is a side elevational view of a tractor with the attachment applied.

Figure 2 is a top plan view of the same.

Figure 3 is a detailed sectional view of a latching means for connecting the cultivator with the steering apparatus of the tractor.

As illustrated in the accompanying drawings, the tractor 1 is provided with a steering shaft 2 having a forwardly disposed lug 3 attached thereto. The lug 3 is provided at its forward end with a recess 4. Brackets 5 are attached to the forward portion of the frame of the tractor 1 and forwardly disposed arms 6 are supported in said brackets. The arms 6 carry at their forward ends a cross-bar 7. Cultivator standards 8 are pivotally connected at their forward ends with the cross-bar 7 and the said standards carry at their rear ends cultivator plates 9. A brace-bar 10 is carried by the cross-bar 7 and an upwardly and rearwardly disposed arm 11 is carried by the brace-bar 10. A cross-arm 12 is mounted upon the arm 11 and an arm 13 is connected with the cross-arm 12 and the lug 3 hereinbefore described. A casing 14 is carried at the under-side of the arm 13 and a spring-pressed bolt 15 is slidable in said casing. The rear end of the bolt 15 is adapted to enter the notch 4 at the forward end of the lug 3. Thus the bar 13 may be held in alignment with the lug 3. The bolt 15 is provided at its forward end with a pin 16 which is received in a slot 17 of an arm 18. The arm 18 is pivoted upon the rear end of the arm 11 hereinbefore described. A rod 19 is connected at its forward end with the outer end of the bar 18 and at its rear end with an operating foot-lever 20. When an operator places his foot upon the lever 20 and swings the same, the rod 19 is moved longitudinally and the bar 18 is swung whereby the bolt 15 is withdrawn from the notch 4 at the forward end of the lug 3 and thus the steering shaft 2 of the tractor is released and the said shaft may be turned by the steering gear in a usual manner and the tractor may make a short turn. When the end of the bolt 5 is in the notch 4, the parts are locked together so that the tractor will travel in a straightforward direction inasmuch as the steering shaft is locked against turning.

Fittings 21 are applied to the sides of the frame of the tractor and carry arms 22 to the upper ends of which are pivoted angle levers 23. The levers 23 are connected with rods 24 which in turn are connected to the beams 8. Rods 25 are connected with the upper ends of the angle levers 23 and with levers 26 pivoted upon the frame of the tractor. When the levers 26 are swung the beams or standards 8 may be raised or lowered.

Cultivator beams 27 are pivotally mounted at the rear end of the tractor frame and carry cultivator plates 28. Bars 29 are mounted at the sides of the tractor frame and levers 30 are fulcrumed upon said bars. Angle levers 31 are pivoted upon the bars 29 and links 32 connect the angle levers with the lower ends of the levers 30. Rods 33 connect the rear ends of the angle levers 31 with the beams 27. Thus by swinging the levers 30, the rear cultivator shovels or plates 28 may be raised or lowered.

Having described the invention, what is claimed is:—

A tractor cultivator attachment comprising in combination with an upstanding steering shaft on the tractor provided with a forwardly projecting lug having a notch in its free end, brackets secured to the tractor frame, arms mounted in said brackets projecting forwardly from the tractor frame, a transverse bar carried by said arms, cultivators having beams pivotally mounted on said bar, means for swinging and lowering said beams, a rearwardly disposed arm, means for supporting the last said arm from the forwardly projecting arms, a centrally arranged forwardly projecting bar disposed in diametrical alignment with said notch when the steering shaft is disposed to direct the tractor steering wheels directly forward, and a spring actuated latch bar carried on the under side of the last named bar, a lever pivotally mounted on the rear end of the rearwardly projecting arm and operatively connected with said latch member, and means for rocking said lever, the latch being engageable with the notch and said steering shaft in one position of the latter and being releasable therefrom on rocking said lever.

In testimony whereof I affix my signature.

IRA L. CHARLESWORTH.